United States Patent
Lee et al.

(10) Patent No.: US 7,517,935 B2
(45) Date of Patent: Apr. 14, 2009

(54) THERMOPLASTIC ELASTOMER COMPOSITION AND METHOD FOR PREPARING THE SAME

(75) Inventors: Hae-Won Lee, Daejeon (KR); Young-Keun Lee, Daejeon (KR); Hwan-Kyu Jung, Daejeon (KR); Tae-Won Park, Daejeon (KR)

(73) Assignee: Hyundai Engineering Plastics Co., Ltd., Chungnam (KR)

( * ) Notice: Subject to any disclaimer, the term of this patent is extended or adjusted under 35 U.S.C. 154(b) by 70 days.

(21) Appl. No.: 10/900,334

(22) Filed: Jul. 28, 2004

(65) Prior Publication Data

US 2005/0043485 A1    Feb. 24, 2005

(30) Foreign Application Priority Data

Aug. 20, 2003 (KR) .................... 10-2003-0057626

(51) Int. Cl.
*C08F 8/00* (2006.01)
*C08J 3/24* (2006.01)
(52) U.S. Cl. .................... 525/194; 525/197; 525/198
(58) Field of Classification Search .................. 525/192, 525/194, 197, 198, 100, 103, 104, 105, 106.133; 524/424, 425, 444, 506, 508, 515, 518, 519, 524/521, 525
See application file for complete search history.

(56) References Cited

U.S. PATENT DOCUMENTS

| | | | |
|---|---|---|---|
| 3,662,206 A | | 5/1972 | Fleck |
| 3,758,643 A | | 9/1973 | Fischer |
| 3,806,558 A | | 4/1974 | Fischer |
| 4,311,628 A | | 1/1982 | Abdou-Sabet et al. |
| 4,340,684 A | * | 7/1982 | Bohm et al. ................. 525/194 |
| 6,407,174 B1 | * | 6/2002 | Ouhadi ........................ 525/192 |
| 6,653,401 B2 | * | 11/2003 | Kinoshita et al. ............. 525/70 |

FOREIGN PATENT DOCUMENTS

EP        0338880        12/1991

\* cited by examiner

*Primary Examiner*—Thao T. Tran
(74) *Attorney, Agent, or Firm*—Clark & Brody

(57) ABSTRACT

Disclosed is a thermoplastic elastomer composition comprising 100 parts by weight of EPDM rubber, 5-1,000 parts by weight of styrenic thermoplastic elastomer, 50-3,000 parts by weight of paraffin oil, 10-200 parts by weight of a polyolefin resin as a curative, 1-15 parts by weight of a phenolic resin, and 0.5-5 parts by weight of a curing activator. The composition is superior in flowability, mechanical properties and oil resistance as well as being low in hardness, so that it can be applied for automobile parts.

9 Claims, No Drawings

THERMOPLASTIC ELASTOMER COMPOSITION AND METHOD FOR PREPARING THE SAME

BACKGROUND OF THE INVENTION

1. Field of the Invention

The present invention relates to a thermoplastic elastomer composition suitable for use in automobile parts. More particularly, the present invention relates to a thermoplastic elastomer composition having excellent flowability, mechanical properties and oil resistance, and capable of being lowered in hardness. Also, the present invention is concerned with a method for the preparation of the same.

2. Description of the Prior Art

It is known in the art that rubber cannot be recycled and is of low productivity. Extensive attempts have been made to develop substitutes capable of overcome the drawbacks of rubber, leading to the development of thermoplastic elastomer (TPE).

TPE, a recyclable rubber material showing properties of both plastic and rubber, is now widely used as a substitute of rubber in the field of automobile parts industries. Also, TPE is rising as a promising alternative for soft PVC because PVC causes environmental problems.

Commercially available TPE includes styrenic thermoplastic elastomer (STPE) and olefinic thermoplastic vulcanicate (TPV) made from a blend of polypropylene (PP)/ethylene propylene diene terpolymer (EPDM) by dynamic vulcanization.

What is required for rubber materials for automobile parts is superiority in compression set, mechanical physical properties, processability, heat resistance at high temperature, and oil resistance. STPE is applied mainly for miscellaneous goods but not used as materials for main parts due to its poor chemical resistance, oil resistance and compression set at high temperature. As for TPV, its applications are found in main automobile parts. However, TPV is very difficult to prepare into articles of low hardness. Practically, TPV is mainly used to make functional parts having a hardness of 55A or greater. Difficulty in preparing articles of low hardness with TPV is due to the fact that PP which itself is of high hardness forms a continuous matrix (main phase) with EPDM rubber dispersed as domains therein.

Extensive studies have been performed to overcome the drawbacks of TPV. For example, U.S. Pat. Nos. 3,662,206, 3,758,643 and 3,806,558 and EP 0 338 880 teach that a blend of polyolefin resin and EPDM rubber is treated with peroxide to partially vulcanize the EPDM rubber. The compositions thus obtained are re-processable and can be molded into articles having good surface properties. However, the compositions are limitedly used for automobile parts because of their high compression set and poor oil resistance.

U.S. Pat. No. 4,311,628 discloses a thermoplastic elastomer composition comprising a blend of polyolefin resin and EPDM rubber in which the rubber is fully or completely cured with phenolic curative in the presence of a curing activator. According to the '628 patent, the aforesaid composition shows excellent compression set and mechanical properties, and considerably improves oil resistance at high temperature. However, improved as it is, the oil resistance (volume change) at high temperature of the composition is still insufficient. This composition is also difficult to mold to complicated shapes due to its poor flowability. Further, because it is almost impossible according to the patent to produce compositions showing a hardness of 45A or lower as well as having a mechanical strength beyond a certain level, the composition of the patent is limitedly applied for automobile parts of hardness 55A or higher.

SUMMARY OF THE INVENTION

Leading to the present invention, the intensive and thorough research on thermoplastic elastomer compositions, conducted by the present inventors, resulted in the finding that the addition of styrenic thermoplastic elastomer and paraffin oil brings about a synergistic improvement in flowability, mechanical properties, elasticity and oil resistance, and make it possible to lower hardness.

Accordingly, it is an object of the present invention to provide a thermoplastic elastomer composition having excellent flowability, mechanical properties, elasticity and oil resistance as well as capable of being lowered in hardness.

It is another object of the present invention to provide a method for preparing the thermoplastic elastomer composition.

In accordance with an aspect of the present invention, there is provided a thermoplastic elastomer composition, comprising 100 parts by weight of EPDM rubber, 5 to 1,000 parts by weight of styrenic thermoplastic elastomer, 50 to 3,000 parts by weight of paraffin oil, 10 to 200 parts by weight of a polyolefin resin, 1 to 15 parts by weight of a phenolic resin as a curative, and 0.5 to 5 parts by weight of a curing activator.

In accordance with another aspect of the present invention, there is provided a method for preparing the thermoplastic elastomer composition, in which dynamic vulcanization is conducted by use of a twin-screw extruder.

DETAILED DESCRIPTION OF THE INVENTION

As mentioned earlier, the present invention is directed to a thermoplastic elastomer composition comprising an ethylene propylene diene terpolymer (EPDM), styrenic thermoplastic elastomer (STPE), paraffin oil, a polyolefin resin, a phenolic curative and a curative activator.

The rubber in which two or more monoolefins are randomly copolymerized can be used in the present invention. Particularly useful in the present invention are ethylene propylene diene terpolymers containing ethylene and propylene as main components. Examples of the diene suitable in the present invention include dicyclopentadiene, 1,4-hexadiene, cyclooctadiene, methylene norbornene, ethylidene norbornene, prophenyl norbornene, and cyclohexadiene, with the most preference to ethylidene norbornene. That is, ethylene-propylene-ethylidene norbornene terpolymer is the most preferable.

Because of being hydrogenated, the styrenic thermoplastic elastomer (STPE) used in the present invention is substantially free of internal double bonds, and thus excellent weather resistance. It can be exemplified by styrene-ethylene/butylenes-styrene block copolymer (hydrogenated polybutadiene polymer), styrene-ethylene/propylene-styrene block copolymer (hydrogenated poly-isoprene polymer), and styrene-ethylene/ethylene/propylene-styrene block copolymer (hydrogenated poly-isoprene/butadiene polymer).

The STPE is used in the amount of about 5 to about 1,000 parts by weight and preferably in the amount of about 20 to about 500 parts by weight, based on 100 parts by weight of the EPDM rubber. For example, the addition of below 5 parts by weight of STPE does not bring about intended effects. On the other hand, if the amount of STPE exceeds 1,000 parts by weight, the final thermoplastic elastomer composition becomes close to a simple STPE compound, deteriorating the intrinsic characteristics of olefinic thermoplastic elastomer (TPV), that is, oil resistance and compression set at high temperature. Thus, the intended properties of the present composition (e.g., the improved flowability and low hardness, simultaneously with the maintenance of the characteristics of TPV) may not be attained on desired level.

STPE may be added during the preparation of TPV or in a separate step after the preparation of TPV. As for the addition of STPE during the preparation of TPV, it may be conducted before, during or after the dynamic vulcanization.

In accordance with the present invention, polyethylene, polypropylene or propylene copolymers may be used as the polyolefin resin. Particularly, crystalline propylene homopolymer is the most preferable. The melt index of PP preferably ranges from about 0.3 to about 40 g/10 min and more preferably from about 0.5 to about 10 g/10 min as measured at 230° C. under a load of 2.16 kg.

The polyolefin resin is used in the amount of about 10 to about 200 parts by weight based on 100 parts by weight of EPDM rubber, and preferably in the amount of about 30 to about 100 parts by weight. For example, less than 10 parts by weight of the polyolefin resin fails in forming a basic TPV morphology. On the other hand, when the polyolefin resin is present in the amount greater than 200 parts by weight, the composition tends to be similar to a simple STPE compound.

In terms of resistance to light and weather, paraffin oils are more suitable for the purposes of the present invention than are naphthenic or aromatic oils. Generally, paraffin oils contain aromatic and naphthenic ingredients and are tinged with yellow due to aromatic ingredients. Aromatic ingredients are labile to light and heat. Particularly, when exposed to light, the oil containing aromatic ingredients changes colors. Accordingly, white oils substantially free of aromatic ingredients are preferred.

In the present invention, two types of paraffin oils are used independently or in combination. Various techniques may be taken to add oils. For example, by using an oil-extended EPDM, oil can be added indirectly. The oil may be used in mixture with rubber or STPE or fed directly to an apparatus for the preparation of thermoplastic elastomers. These techniques may be employed in combination.

The amount of oil in the composition of the present invention ranges from about 50 to about 3,000 parts by weight based on 100 parts by weight of the EPDM rubber and preferably from about 100 to about 1,000 parts by weight. For example, if the oil is used in the amount less than 50 parts by weight, the composition suffers a processing problem due to its poor flowability. On the other hand, more than 3,000 parts by weight of oil is apt to raise an oil bleeding problem.

A phenolic resin is employed as a curative in the present invention. Commercially available are dimethylol phenol resins and halogenated dimethyl phenol resins. Dimethylol phenol resins show low curing rate and need a halogen donor as a curing activator. Metal halide compounds may be used as halogen donors, but are too caustic to apply for the composition of the present invention. Thus, the halogenated phenol resin is preferably employed in the present invention. In this case, a metal oxide may be used as a curing activator, rather than the halogen donor.

According to the present invention, the curative is contained in the amount of about 1 to about 15 parts by weight per 100 parts by weight of the EPDM rubber and preferably in the amount of about 5 to about 12 parts by weight. For example, EPDM is hardly crosslinked in the presence of too little curative. On the other hand, when too much curative is used, the crosslinking of EPDM is greatly developed in the early stage so that coarse EPDM particles form, resulting in an undesirable morphology.

Examples of the curing activator useful in the present invention include ZnO and MgO, with preference for ZnO. Its amount falls into a range of about 0.5 to about 5 parts by weight based on 100 parts by weight of EPDM rubber and preferably into a range of about 1.5 to about 3.5 parts by weight.

To modify the thermoplastic elastomer composition of the present invention, various additives well known in the rubber and plastic formulation art may be used. Examples of the additives include inorganic fillers, flame retardants, processing aids, carbon black, pigments, antioxidants, UV stabilizers, and releasing agents. In particular, inorganic fillers may be used in the amount of about 5 to about 500 parts by weight based on 100 parts by weight of EPDM rubber.

The preparation of the thermoplastic elastomer composition of the present invention may resort to the conventional compounding machine such as a twin-screw extruder, a Banbury mixer and the like. When a twin-screw extruder is employed to subject the components to dynamic vulcanization, a high shear is generated to make EPDM particles fine and uniform, resulting in the formation of a good morphology.

Also, the thermoplastic elastomer composition may be obtained by adding to the conventional PP/EPDM TPV, STPE and paraffin oil in the mixing ratio according to the present invention and compounding the mixture in a twin-screw extruder or a Banbury mixer.

A better understanding of the present invention may be obtained in light of the following examples which are set forth to illustrate, but are not to be construed to limit the present invention.

Components employed in the examples are described regarding properties as follows:

| | |
|---|---|
| EPDM | oil-extended EPDM comprising EPDM and oil in a weight ratio of 1:1, ethylene-propylene-ethylidenenorbornene (ENB) terpolymer, ethylene/propylene 70/30, ENB content 4.7 wt %, ML*1 + 8(125° C.) = 46.5 |
| PP | polypropylene homopolymer, MI(230° C., 2.16 kg) = 1.5 g/10 min |
| Phenolic resin | Brominated octylphenol/formaldehyde heat-reactive resin, methylol content 11.1%, bromine content 3.8% |
| ZnO | KS-1 (Hanil Chemical Co. Korea) |
| STPE: | Kraton G1651 (Kraton Polymers, U.S.A.) styrene-ethylene/butylenes-styrene block copolymer polystyrene content 31.2 to 34.6 wt %, powder |
| Paraffin oil I | Miclube 1460 (Michang Oil Ind. Co. Ltd. Korea) Kinematic viscosity(40° C.) = 483 cSt |
| Paraffin oil II | White oil 1900(Michang Oil Ind. Co. Ltd., Korea) Kinematic viscosity(40° C.) = 187 cSt |
| Talc | KCM-6300(KOCH Co. Ltd., Korea) |
| Colorant | BK-3(SEIGI Produces Co., Korea) carbon black content 45 wt % |
| Antioxidant | SONGNOX 21B (Songwon Industrial. Co. Ltd., Korea) |
| Processing aid: | L-C 102N(Lion Chemtech Co. Ltd., Korea) polyethylene wax |

*Mooney Viscosity

COMPARATIVE EXAMPLE 1

Prepared was a conventional fully crosslinked TPV in which PP were mixed in a weight ratio of 40:60 with the EPDM which underwent dynamic vulcanization with the crosslinking degree amounting to 98%.

For the preparation of the conventional TPV, a co-rotating intermeshing-type twin-screw extruder with a screw diameter of 58φ, L/D=48 was employed. While the screw rotated at a speed of 350 rpm, the components shown in Table 1 were processed at 180-210° C. In Comparative Example 1, paraffin oil I was impregnated into the EPDM rubber to give a premix.

Example 1

100 wt. parts of Paraffin oil II (White oil) was impregnated into 100 wt. Parts of STPE to give a premix, which was then blended with the conventional TPV (Comparative Example 1) in a twin-screw extruder as shown in Table 1, below. Used was a co-rotating intermeshing-type twin-screw extruder with a screw diameter of 40φ, L/D=38. While being fed through a main feeder, all materials were processed at 180-210° C. at a screw rotation speed of 200 rpm.

Example 2

A thermoplastic elastomer composition was prepared in the same manner as in Example 1, with the exception that 150 wt. parts, instead of 100 wt. parts, of the paraffin oil II (white oil) was mixed with 100 wt. parts of STPE.

Example 3

A thermoplastic elastomer composition was prepared in the same manner as in Example 1, with the exception that 200 wt. parts, instead of 100 wt. parts, of the paraffin oil II (white oil) was mixed with 100 wt. parts of STPE.

Example 4

The same procedure as in Example 3 was conducted with the exception that STPE was mixed with TPV in a weight ratio of 10:100.

Example 5

The same procedure as in Example 3 was conducted with the exception that STPE was mixed with TPV in a weight ratio of 16.7:100.

Example 6

The same procedure as in Example 3 was conducted with the exception that STPE was mixed with TPV in a weight ratio of 33.3:100.

Example 7

The same procedure as in Example 4 was conducted with the exception that the paraffin oil II was fed through an oil feeder.

Each of the compositions prepared in Examples 1 to 7 and Comparative Example 1 was molded to a sheet with a dimension of 150×150×2 mm by use of a press and then evaluated for physical properties.

Test methods are as follows and the results are given in Table 2, below.

Specific Gravity: ASTM D297

Hardness: ASTM D2240, measured after five seconds.

Tensile strength, Elongation, 100% Modulus: ASTM D412

Tension set: ASTM D412

Compression set: ASTM D395-B, 12.7 mm thick specimen

Heat Resistance(Oven aging test): ASTM D865(120° C., 168hr)

Oil Resistance(Volume change): ASTM D471 (ASTM#3 oil)

-MI: ASTM D1238 (200° C., 7.06 kg)

Separately, the compositions were extruded at 200° C. through a Brabender single extruder (19φ, L/D=24) equipped with a tube die while rotating the screw at a speed of 80 rpm. The surfaces of the extudates were observed every meter for smoothness and large gel formation.

Evaluation standards for surface appearances of samples

○: smooth, no large gel.

Δ: wave patterns, no large gel

X: rough, large gel

TABLE 1

| Component | 1 | 2 | 3 | 4 | 5 | 6 | 7 | C. 1 |
|---|---|---|---|---|---|---|---|---|
| EPDM | | | | | | | | 200 |
| Paraffin Oil I | | | | | | | | 40 |
| Talc | | | | | | | | 42 |
| PP | | | | | | | | 66.7 |
| Phenol Resin | | | | | | | | 8 |
| ZnO | | | | | | | | 2.5 |
| Colorant | | | | | | | | 5 |
| Processing Aid | | | | | | | | 4 |
| Antioxidant | | | | | | | | 1 |
| C. Exmp. 1 | 100 | 100 | 100 | 100 | 100 | 100 | 100 | |
| STPE | 6.6 | 6.6 | 6.6 | 10 | 16.7 | 33.3 | 10 | |
| Paraffin Oil II | 6.6 | 9.9 | 13.2 | 20 | 33.3 | 66.7 | 20 | |

TABLE 2

| Physical Properties | Unit | 1 | 2 | 3 | 4 | 5 | 6 | 7 | C. 1 |
|---|---|---|---|---|---|---|---|---|---|
| Specific Gravity | — | 0.97 | 0.97 | 0.96 | 0.96 | 0.96 | 0.95 | 0.96 | 0.98 |
| Hardness | Shore A | 69 | 67 | 65 | 64 | 55 | 44 | 62 | 72 |
| Tensile Strength | kgf/cm$^2$ | 104 | 86 | 84 | 80 | 73 | 64 | 78 | 104 |
| Elongation | % | 430 | 410 | 450 | 400 | 440 | 480 | 420 | 370 |
| 100% Modulus | kgf/cm$^2$ | 33.6 | 30.5 | 27.8 | 26.5 | 21.2 | 14.7 | 25.2 | 40.9 |
| Tension set | % | 8.4 | 7.7 | 7.0 | 6.8 | 6.3 | 5.0 | 6.7 | 12.0 |

TABLE 2-continued

|  | Unit | Examples | | | | | | | |
| --- | --- | --- | --- | --- | --- | --- | --- | --- | --- |
| Physical Properties | Unit | 1 | 2 | 3 | 4 | 5 | 6 | 7 | C. 1 |
| Compression set* | | | | | | | | | |
| 23° C. × 72 hr | % | 21 | 20 | 19 | 17 | 15 | 13 | 18 | 22 |
| 70° C. × 72 hr | % | 31 | 30 | 30 | 29 | 27 | 25 | 30 | 32 |
| 120° C. × 72 hr | % | 49 | 49 | 49 | 49 | 50 | 60 | 50 | 45 |
| MI(200° C., 7.06 kg) | g/10 min | 1.6 | 2.2 | 3.3 | 4.5 | 7.0 | 11.9 | 4.8 | 0.9 |
| Heat Resistance(120° C. × 168 hr) | | | | | | | | | |
| Tensile Strength Maintenance | % | 95 | 106 | 101 | 106 | 99 | 102 | 100 | 91 |
| Elongation Maintenance | % | 97 | 101 | 99 | 108 | 99 | 105 | 99 | 100 |
| Hardness Change | Shore A | −1 | +1 | +1 | −1 | −2 | −4 | −2 | +1 |
| Oil Resistance(125° C. × 168 hr) | | | | | | | | | |
| Volume Change | % | 68 | 64 | 63 | 61 | 58 | 55 | 60 | 70 |
| Appearance | | ○ | ○ | ○ | ○ | ○ | ○ | ○ | ○ |

*25% deformation ratio applied upon test

As apparent from Table 2, the addition of STPE and paraffin oil to the conventional fully crosslinked PP/EPDM TPV (Comparative Example 1) leads to an improvement not only in tension set but also in flowability (MI). On the contrary, the conventional fully crosslinked PP/EPDM TPV showed poor flowability with the decrease of the hardness because the relative content of EPDM increased. In addition, the conventional TPV suffered from an increase in volume change upon oil resistance testing. Data obtained in Examples 1 to 7 demonstrate that STPE and paraffin oil play an important role in improving the volume change as well as lowering hardness. In particular, it is believed that such effects can be more prominent by increasing the oil content.

Based on data from Examples 1 to 7, it is economically favorable to subject the ingredients for the conventional PP/EPDM TPV, STPE and oil to dynamic vulcanization in a twin-screw extruder. In Examples 8 to 13, thermoplastic elastomers of good quality were prepared by conducting dynamic vulcanization in a twin-screw extruder and the results are given in Table 4, below.

Example 8

While a premix comprising STPE, oil and talc was fed through a side feeder located on the rear of a twin-screw, PP was formulated in a ratio of 45:55 with EPDM. Components used in the composition are shown in Table 3, below.

Example 9

The same procedure as in Example 8 was carried out with the exception that the amount of the premix was increased as shown in Table 3.

Example 10

The same composition as in Example 9 was prepared with the exception that the premix was partly fed through a main feeder and the remainder through a side feeder.

Example 11

The same composition as in Example 9 was prepared with the exception that all of the premix was fed through a main feeder.

Example 12

A thermoplastic elastomer composition of low hardness, as shown in Table 3, was prepared by employing the procedure of Example 7, with the exception that while PP was formulated in a weight ratio of 40:60 with EPDM.

Example 13

The same procedure as in Example 12 was carried out with the exception that the amount of the premix was increased as shown in Table 3 to obtain a composition showing a lower hardness.

COMPARATIVE EXAMPLE 2

A fully crosslinked PP/EPDM TPV in which PP was formulated in a weight ratio of 25:75 with EPDM, in the same manner as in Comparative Example 1 with the exception that the amount of PP was decreased from 66.7 to 33.3 parts by weight.

TABLE 3

|  | Examples | | | | | | |
| --- | --- | --- | --- | --- | --- | --- | --- |
| Components | 8 | 9 | 10 | 11 | 12 | 13 | C. 2 |
| EPDM | 200 | 200 | 200 | 200 | 200 | 200 | 200 |
| Paraffin Oil I | 40 | 40 | 40 | 40 | 40 | 40 | 40 |
| Talc | 42 | 42 | 42 | 42 | 42 | 42 | 42 |
| PP | 81.8 | 81.8 | 81.8 | 81.8 | 66.7 | 66.7 | 33.3 |
| Phenol Resin | 8 | 8 | 8 | 8 | 8 | 8 | 8 |
| ZnO | 2.5 | 2.5 | 2.5 | 2.5 | 2.5 | 2.5 | 2.5 |
| Colorant | 5 | 5 | 5 | 5 | 5 | 5 | 5 |
| Processing Aid | 4 | 4 | 4 | 4 | 4 | 4 | 4 |
| Antioxidant | 1 | 1 | 1 | 1 | 1 | 1 | 1 |
| Premix* | | | 120 | 270 | | | |
| Premix** | 100 | 270 | 150 | | 800 | 1000 | |

*fed through a main feeder (STPE/Paraffin oil II/talc 100/200/15)
**fed through a side feeder (STPE/Paraffin oil II/talc 100/200/15)

TABLE 4

| Physical Properties | Unit | Examples 8 | 9 | 10 | 11 | 12 | 13 | C. 2 |
|---|---|---|---|---|---|---|---|---|
| Specific Gravity | — | 0.96 | 0.95 | 0.95 | 0.95 | 0.93 | 0.93 | 0.98 |
| Hardness | shore A | 69 | 55 | 56 | 56 | 33 | 25 | 57 |
| Tensile Strength | kgf/cm$^2$ | 93 | 73 | 70 | 73 | 54 | 52 | 55 |
| Elongation | % | 485 | 540 | 505 | 545 | 700 | 800 | 360 |
| 100% Modulus | kgf/cm$^2$ | 28.8 | 20 | 20 | 21 | 8.0 | 6.0 | 22.6 |
| Tension set | % | 7.5 | 6.7 | 6.9 | 7.0 | 0.7 | 0.5 | 7.0 |
| Compression set* | | | | | | | | |
| 23° C. × 72 hr | % | 20 | 16 | 16 | 17 | 5 | 4 | 18 |
| 70° C. × 72 hr | % | 33 | 27 | 27 | 27 | 20 | 25 | 24 |
| 120° C. × 72 hr | % | 48 | 45 | 45 | 43 | 50 | NA | 38 |
| MI(200° C., 7.06 kg) | g/10 min | 6.0 | 8.5 | 3.3 | 1.6 | 15.3 | 20.8 | 0.1 |
| Heat Resistance(120° C. × 168 hr) | | | | | | | | |
| Tensile Strength Maintenance | % | 101 | 106 | 98 | 99 | 90 | 110** | 102 |
| Elongation Maintenance | % | 101 | 101 | 97 | 104 | 95 | 116** | 98 |
| Hardness Change | shore A | −1 | −5 | −4 | −4 | −6 | 0** | +1 |
| Oil Resistance(125° C. × 168 hr) | | | | | | | | |
| Volume Change | % | 62 | 55 | 58 | 66 | 49 | — | 120 |
| Surface of extrudate | | ○ | ○ | ○ | Δ | ○ | ○ | X |

*25% deformation ratio applied upon test
**heat resistance test condition: 100° C. × 168 hrs A composition with low hardness is difficult to prepare from the conventional PP/EPDM TPV. The conventional PP/EPDM TPV composition is not commercially applicable due to its poor mechanical strength (tensile strength). The results obtained from Examples as above demonstrate that thermoplastic elastomer compositions of low hardness, superior in mechanical strength, can be easily obtained by controlling the amount of the premix containing STPE/oil. Particularly, both of the compositions prepared in Examples 12 and 13 exhibit tensile strength greater than 50 kgf/cm$^2$ in spite of low hardness less than 35A, as well as unexpected improvements in flowability (MI).

Prepared in Comparative Example 2 was a fully crosslinked PP/EPDM TPV having a hardness of as high as 55A and a melt index of as low as 0.1, which is difficult to mold into articles. On the contrary, the compositions obtained in Examples 8 to 13 are so greatly improved in flowability as to advantageously mold various articles therewith.

Another advantage of the compositions according to the present invention over the conventional compositions may be found in volume change. After oil resistance testing, the conventional PP/EPDM TPV tends to increase in volume change as the hardness is decreased. In contrast, the compositions of the present invention exhibit decreased volume changes.

Furthermore, extudates from the compositions of the present invention have good surfaces which is attributed to the contribution of STPE and oil. As found in the extruded surfaces, the fully-crosslinked PP/EPDM TPV of Comparative Example 2 is very poor in flowability and produces large gels due to a low content of PP and a shortage of matrix.

How to feed STPE and oil also exerts influence on the flowability. As seen with the compositions of Examples 9, 10 and 11, better flowability can be obtained when feeding the premix after than before dynamic vulcanization. However, the compositions of the present invention, even if the premix is fed before dynamic vulcanization, are significantly improved in flowability as compared to the conventional PP/EPDM TPV.

In consequence, the thermoplastic elastomer compositions of the present invention enjoy the advantage of superior flowability, mechanical properties and oil resistance as well as low hardness, so that they can be applied for complex contour parts as well as parts requiring low hardness over all the industries.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A thermoplastic elastomer composition, consisting essentially of 100 parts by weight of EPDM rubber, 5 to 1,000 parts by weight of styrenic block copolymer as a thermoplastic elastomer, 50 to 3,000 parts by weight of paraffin oil, 10 to 200 parts by weight of a polyolefin resin, 1 to 15 parts by weight of a phenolic resin as a curative, and 0.5 to 5 parts by weight of a curing activator, wherein the styrenic block copolymer thermoplastic elastomer is selected from the group consisting of styrene-ethylene/butylene-styrene block copolymer, styrene-ethylene/propylene-styrene block copolymer, and styrene-ethylene/ethylene/propylene/styrene block copolymer.

2. The thermoplastic elastomer composition as set forth in claim 1, further comprising 5 to 500 parts by weight of inorganic fillers based on 100 parts by weight of EPDM rubber.

3. The thermoplastic elastomer composition as set forth in claim 1, wherein the polyolefin resin is crystalline propylene homopolymer.

4. The thermoplastic elastomer composition as set forth in claim 3, wherein a melt index of the polyolefin resin ranges from 0.3 to 40 g/10 min as measured at 230° C. under a load of 2.16 kg.

5. The thermoplastic elastomer composition as set forth in claim 1, wherein the curing activator is ZnO or MgO.

6. A process for preparing the thermoplastic elastomer, which comprises subjecting the composition of claim 1 to dynamic vulcanization by use of a twin-screw extruder.

7. The thermoplastic elastomer composition as set forth in claim 1, wherein the composition exhibits decreased volume changes upon oil resistance testing, low hardness, and improved flowability.

8. A thermoplastic elastomer composition consisting essentially of 100 parts by weight of the EPDM rubber, 20 to 500 parts by weight of the styrenic block copolymer thermoplastic elastomer, 100 to 1,000 parts by weight of the paraffin oil, 30 to 100 parts by weight of the polyolefin resin, 5 to 12 parts by weight of the phenolic resin, and 1.5 to 3.5 parts by weight of the curing activator, wherein the styrenic block copolymer thermoplastic elastomer is selected from the group consisting of styrene-ethylene/butylene-styrene block copolymer, styrene-ethylene/propylene-styrene block copolymer, and styrene-ethylene/ethylene/propylene/styrene block copolymer.

9. The thermoplastic elastomer composition as set forth in claim 8, wherein the composition exhibits decreased volume changes upon oil resistance testing, low hardness, and improved flowability.

* * * * *